(12) United States Patent
Tokunaga

(10) Patent No.: US 9,019,384 B2
(45) Date of Patent: *Apr. 28, 2015

(54) INFORMATION PROCESSING APPARATUS AND CONTROL METHOD THEREOF

(71) Applicant: Canon Kabushiki Kaisha, Tokyo (JP)

(72) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 13/747,773

(22) Filed: Jan. 23, 2013

(65) Prior Publication Data

US 2013/0135483 A1    May 30, 2013

Related U.S. Application Data

(63) Continuation of application No. 12/354,341, filed on Jan. 15, 2009, now Pat. No. 8,386,582.

(30) Foreign Application Priority Data

Jan. 23, 2008 (JP) ................................. 2008-013090
Jan. 6, 2009 (JP) ................................. 2009-001109

(51) Int. Cl.
```
H04N 5/225      (2006.01)
G11B 27/034     (2006.01)
G11B 27/30      (2006.01)
H04N 1/00       (2006.01)
H04N 5/232      (2006.01)
```

(52) U.S. Cl.
CPC .............. *H04N 5/225* (2013.01); *G11B 27/034* (2013.01); *G11B 27/3027* (2013.01); *H04N 1/00236* (2013.01); *H04N 1/00241* (2013.01); *H04N 1/00442* (2013.01); *H04N 5/232* (2013.01); *H04N 2201/0084* (2013.01)

(58) Field of Classification Search
CPC .......... H04N 1/00236; H04N 1/00241; H04N 1/00442; H04N 2201/0084
See application file for complete search history.

(56) References Cited

U.S. PATENT DOCUMENTS

| | | | |
|---|---|---|---|
| 6,020,920 A * | 2/2000 | Anderson | 348/222.1 |
| 6,134,606 A * | 10/2000 | Anderson et al. | 710/14 |
| 6,163,816 A * | 12/2000 | Anderson et al. | 710/8 |
| 6,177,957 B1 * | 1/2001 | Anderson | 348/231.99 |
| 6,256,063 B1 * | 7/2001 | Saito et al. | 348/231.99 |
| 6,262,769 B1 * | 7/2001 | Anderson et al. | 348/333.1 |
| 6,275,260 B1 * | 8/2001 | Anderson | 348/239 |

(Continued)

FOREIGN PATENT DOCUMENTS

| | | | |
|---|---|---|---|
| JP | 2006-107289 A | 4/2006 |
| JP | 2006-345402 A | 12/2006 |

*Primary Examiner* — Backhean Tiv
(74) *Attorney, Agent, or Firm* — Cowan, Liebowitz & Latman, P.C.

(57) ABSTRACT

An information processing apparatus obtains image data included in an image file stored in a storage medium of the digital camera and the updated time of the image file stored in the storage medium of the digital camera, and reads out the shooting time of the image data included in the header of the image file stored in the storage medium of the information processing apparatus. The information processing apparatus displays a first view that displays the image data in an order based on the obtained updated time, and a second view that displays the image data included in the image file stored in the storage medium of the information processing apparatus in an order based on the read out shooting time.

21 Claims, 13 Drawing Sheets

(56) References Cited

U.S. PATENT DOCUMENTS

| | | | |
|---|---|---|---|
| 6,278,447 B1* | 8/2001 | Anderson | 715/723 |
| 6,353,848 B1* | 3/2002 | Morris | 709/203 |
| 6,501,911 B1* | 12/2002 | Malloy Desormeaux | 396/311 |
| 6,507,363 B1* | 1/2003 | Anderson et al. | 348/231.9 |
| 7,015,957 B2* | 3/2006 | Romano et al. | 348/231.1 |
| 7,034,871 B2* | 4/2006 | Parulski et al. | 348/231.3 |
| 7,057,648 B2* | 6/2006 | Parulski et al. | 348/231.2 |
| 7,161,618 B1* | 1/2007 | Niikawa et al. | 348/207.1 |
| 7,188,319 B2* | 3/2007 | Amadio et al. | 715/835 |
| 7,325,198 B2* | 1/2008 | Adcock et al. | 715/722 |
| 7,443,418 B2* | 10/2008 | Bryant et al. | 348/207.1 |
| 7,444,354 B2* | 10/2008 | Kaburagi et al. | 1/1 |
| 7,505,065 B2* | 3/2009 | Oura et al. | 348/207.1 |
| 7,583,291 B2* | 9/2009 | Holmes | 348/207.1 |
| 7,676,118 B2* | 3/2010 | Liu et al. | 382/306 |
| 7,742,074 B2* | 6/2010 | Minatogawa | 348/207.1 |
| 7,847,850 B2* | 12/2010 | Takagi et al. | 348/333.02 |
| 8,386,582 B2* | 2/2013 | Tokunaga | 709/217 |
| 2002/0003575 A1* | 1/2002 | Marchese | 348/231 |
| 2002/0054224 A1* | 5/2002 | Wasula et al. | 348/232 |
| 2003/0112344 A1* | 6/2003 | Sato | 348/231.3 |
| 2003/0122950 A1* | 7/2003 | Anderson | 348/333.02 |
| 2003/0184650 A1* | 10/2003 | Brown et al. | 348/207.1 |
| 2004/0114176 A1* | 6/2004 | Bodin et al. | 358/1.15 |
| 2005/0012828 A1* | 1/2005 | Oka | 348/231.2 |
| 2005/0012829 A1* | 1/2005 | Tashiro et al. | 348/231.99 |
| 2005/0097120 A1* | 5/2005 | Cooper et al. | 707/102 |
| 2005/0151858 A1* | 7/2005 | Nozaki et al. | 348/231.9 |
| 2005/0237391 A1* | 10/2005 | Shibuya et al. | 348/207.1 |
| 2005/0243176 A1* | 11/2005 | Wu et al. | 348/207.1 |
| 2006/0017820 A1* | 1/2006 | Kim | 348/231.2 |
| 2007/0035551 A1* | 2/2007 | Ubillos | 345/581 |
| 2007/0073776 A1* | 3/2007 | Kalalian et al. | 707/104.1 |
| 2008/0025649 A1* | 1/2008 | Liu et al. | 382/305 |
| 2008/0123966 A1* | 5/2008 | Nishida et al. | 382/203 |
| 2008/0129757 A1* | 6/2008 | Tanaka et al. | 345/660 |
| 2008/0147664 A1* | 6/2008 | Fujiwara et al. | 707/7 |
| 2009/0231441 A1* | 9/2009 | Walker et al. | 348/207.1 |
| 2010/0066839 A1* | 3/2010 | Azuma et al. | 348/207.1 |
| 2011/0205373 A1* | 8/2011 | Wasula et al. | 348/207.1 |

* cited by examiner

F I G. 7

| SORT LIST | |
|---|---|
| IMAGE ID | SHOOTING DATE AND TIME |
| IMG_0003 | 2007/1/1  0 : 05 : 00 |
| IMG_0004 | 2007/1/1  0 : 15 : 00 |
| IMG_0007 | 2007/1/1  0 : 20 : 00 |
| IMG_0010 | 2007/1/2  9 : 30 : 00 |
| IMG_0005 | 2007/1/2  9 : 40 : 00 |
| IMG_0009 | 2007/1/2  12 : 50 : 00 |
| IMG_0001 | 2007/1/3  19 : 30 : 00 |
| IMG_0008 | 2007/1/3  20 : 00 : 00 |
| IMG_0002 | 2007/1/3  22 : 25 : 00 |
| IMG_0006 | 2007/1/3  22 : 30 : 00 |

FIG. 9

| SORT LIST ||
|---|---|
| IMAGE ID | SHOOTING DATE AND TIME |
| IMG_0003 | 2007/1/1 0 : 05 : 00 |
| IMG_0004 | 2007/1/1 0 : 15 : 00 |
| IMG_0007 | 2007/1/1 0 : 20 : 00 |
| IMG_0010 | 2007/1/2 9 : 30 : 00 |
| IMG_0005 | 2007/1/2 9 : 40 : 00 |
| IMG_0009 | 2007/1/2 12 : 50 : 00 |
| IMG_0001 | 2007/1/3 19 : 30 : 00 |
| IMG_0008 | 2007/1/3 20 : 00 : 00 |
| IMG_0002 | 2007/1/3 22 : 25 : 00 |
| IMG_0006 | 2007/1/3 22 : 30 : 00 |

FIG. 10

| IMAGE LIST |||
|---|---|---|
| IMAGE FILENAME | UPDATED DATE AND TIME | SHOOTING DATE AND TIME |
| IMG_0001 | 2007/1/4 16 : 30 : 00 | 2007/1/1 0 : 05 : 00 |
| IMG_0002 | 2007/1/1 0 : 15 : 00 | 2007/1/1 0 : 15 : 00 |
| IMG_0003 | 2007/1/2 0 : 20 : 00 | 2007/1/2 0 : 20 : 00 |
| IMG_0004 | 2007/1/5 20 : 30 : 00 | 2007/1/3 9 : 30 : 00 |
| IMG_0005 | 2007/1/3 9 : 40 : 00 | 2007/1/3 9 : 40 : 00 |

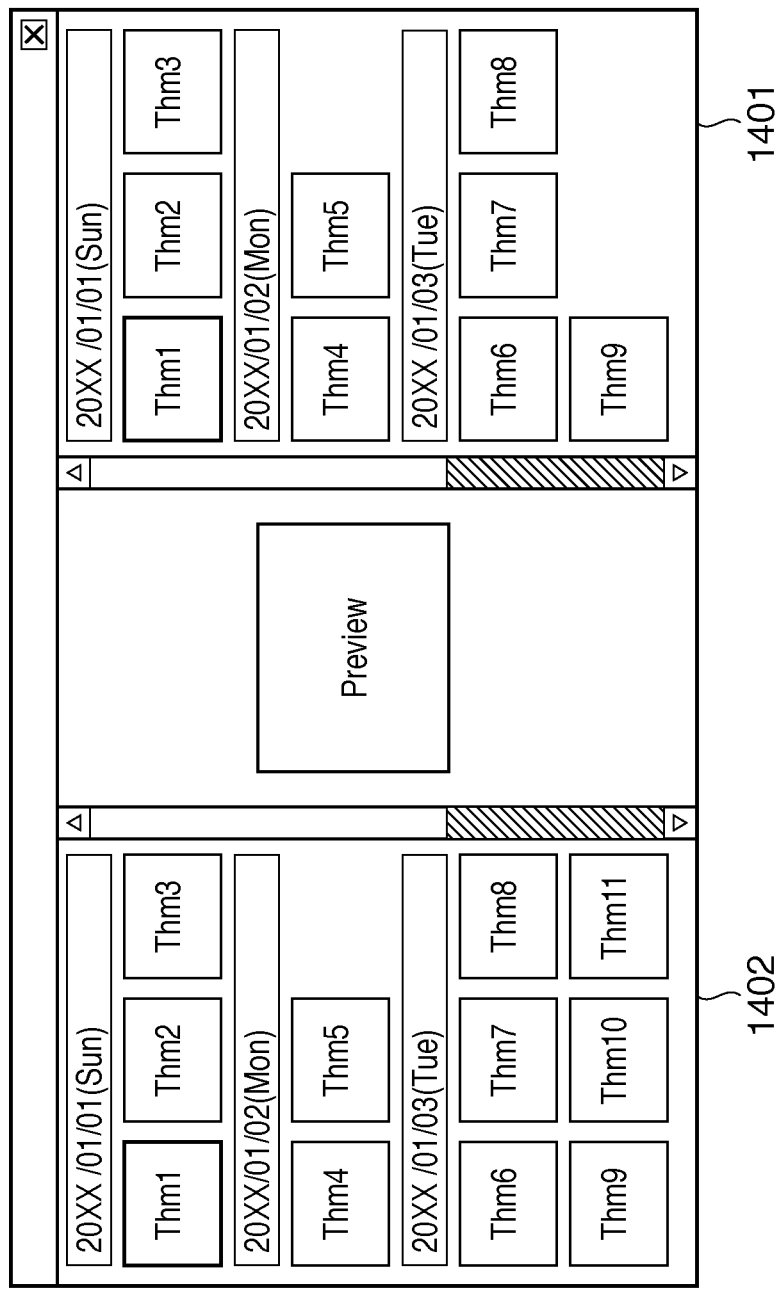

INFORMATION PROCESSING APPARATUS AND CONTROL METHOD THEREOF

CROSS-REFERENCE TO RELATED APPLICATIONS

This application is a continuation of application Ser. No. 12/354,341, filed Jan. 15, 2009 the entire disclosure of which is hereby incorporated by reference.

BACKGROUND OF THE INVENTION

1. Field of the Invention

The present invention relates to an information processing apparatus that displays a captured image imported from a camera into the apparatus, a captured image located in a camera, and the like, as well as to an image display method thereof.

2. Description of the Related Art

With the recent spread of digital cameras, the increase in the capacity of storage devices, and so on, it is becoming more and more common for users to use digital image data to display a large number of images on PC (personal computer) screens, and browse and edit those images. Against this background, various types of image display methods have been proposed with the purpose of making the browsing of a large amount of data located in PCs, cameras, and so on more efficient.

Japanese Patent Laid-Open No. 2005-333171 (called "Patent Document 1" hereinafter) can be given as an example of a method for displaying image data located within a PC, camera, or the like. In Patent Document 1, when a list of multiple images is displayed using information such as their shooting dates and times, the image files are sorted using date and time data considered by the user to be appropriate, selected from date and time data recorded within the image file and updated date and time data of the image file. To be more specific, it is possible to set a priority order for the date and time information used as a key for sorting the image files. Therefore, it is possible for the user to preferentially select, from among the date and time data recorded in the image files and the updated date and time data of the image files, the data that she or he feels is appropriate as a key, and sort the image files.

However, typical image display processes, such as that included in Patent Document 1, do not take into consideration the difference in processing speeds between the case where image files are received from an external device such as a camera and sorted, and the case where image files within the PC are sorted. For this reason, when using one of these dates and times for sorting, obtaining the sort results for the image files within the external device tends to require more time than obtaining the sort results for the image files within the PC. Such a difference in speeds for the sorting processes results in a sense of unnaturalness of the part of the user.

SUMMARY OF THE INVENTION

According to one aspect of the present invention, there is provided an information processing apparatus capable of communicating with a digital camera, the apparatus comprising:

a first obtaining unit that obtains, from the digital camera, first image data included in an image file stored in a storage medium of the digital camera;

a second obtaining unit that obtains, from the digital camera, the updated time of the image file stored in the storage medium of the digital camera;

a readout unit that reads out the shooting time of second image data, the shooting time being included in the header of an image file stored in the storage medium of the information processing apparatus; and a display unit capable of displaying a first view that displays the first image data obtained by the first obtaining unit in an order based on the updated time obtained by the second obtaining unit, and a second view that displays the second image data included in the image file stored in the storage medium of the information processing apparatus in an order based on the shooting time read out by the readout unit.

Also, according to one aspect of the present invention, there is provided a control method for an information processing apparatus capable of communicating with a digital camera, the method comprising:

a first obtaining step of obtaining, from the digital camera, first image data included in an image file stored in a storage medium of the digital camera;

a second obtaining step of obtaining, from the digital camera, the updated time of the image file stored in the storage medium of the digital camera, the updated time being included in a file system of the digital camera;

a reading step of reading out the shooting time of second image data, the shooting time being included in the header of an image file stored in the storage medium of the information processing apparatus; and a display step of displaying a first view that displays the first image data obtained in the first obtaining step in an order based on the updated time obtained in the second obtaining step, and a second view that displays the second image data included in the image file stored in the storage medium of the information processing apparatus in an order based on the shooting time read out in the reading step.

Further features of the present invention will become apparent from the following description of exemplary embodiments (with reference to the attached drawings).

BRIEF DESCRIPTION OF THE DRAWINGS

FIG. 7 is a diagram illustrating a list (sort results) obtained by sorting images displayed in the PC view by shooting date and time.

FIG. 9 is a diagram illustrating a list (sort results) obtained by sorting images displayed in the camera view by updated date and time.

FIG. 10 is a diagram illustrating an example in which the updated date and time and the shooting date and time of images saved in the digital camera differ.

FIG. 14 is a diagram illustrating an example of a user interface of an image processing apparatus according to an embodiment of the present invention.

DESCRIPTION OF THE EMBODIMENTS

Exemplary embodiments of the present invention will now be described in detail in accordance with the accompanying drawings.

(Configuration of Computer)

Figure 1:
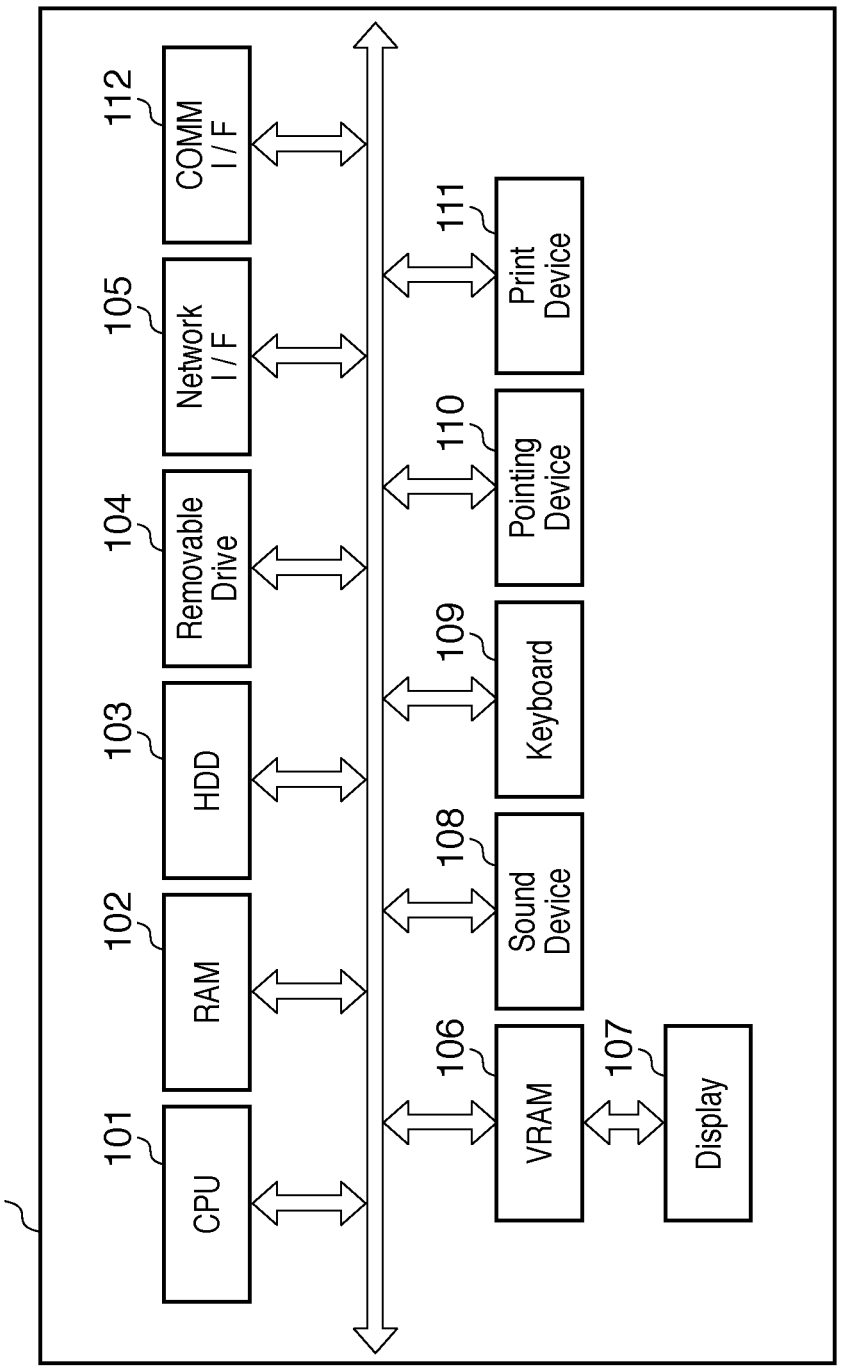
FIG. 1 is a block diagram illustrating an example of the configuration of a computer serving as an image processing apparatus according to an embodiment of the present invention.

FIG. 1 is a block diagram illustrating the configuration of a computer 100, serving as an example of an information processing apparatus, according to the present embodiment.

Reference numeral 101 refers to a CPU (Central Processing Unit), and controls the image processing apparatus.

Reference numeral 102 refers to a RAM (Random Access Memory), and has an area in which programs, image data, and so on are expanded. The programs expanded in the RAM 102 are, for example, program code for performing image display and image processing control, and are executed by the CPU 101. The RAM 102 is also used as a working area for the CPU 101, an area for saving data during error processing, and so on.

Reference numeral 103 refers to a HDD (Hard Disk Drive). The HDD 103 can store various control programs executed by the image processing apparatus, content files such as image files and text files, and so on. Note that the HDD 103 may be a device that is removable from the computer 100, or may be a device that is unremovably installed in the computer 100.

Reference numeral 104 refers to a removable drive, and is a device that reads from and writes to an external storage medium. When stored in the external storage medium, programs, image data, and the like are loaded into the RAM 102 via the removable drive 104. Optical disk drives such as drives for DVD-RWs, CD-ROMs, CD-Rs, DVD-RAMS, and so on, drives for flexible disks, drives for magnetic disks such as MOs, drives for non-volatile memories such as flash memories, and so on are examples of the removable drive 104.

Reference numeral 105 refers to a network I/F. Programs, image data, and so on stored in recording devices accessible by connecting to a LAN (Local Area Network), the World Wide Web, and so on are loaded via this device.

Reference numeral 106 refers to a VRAM (Video RAM), and is a memory that provides video signals such as image data, UIs (user interfaces) for executed programs, and so on.

Reference numeral 107 refers to a display, and performs processing for displaying video signals input by the VRAM 106. For example, a CRT (Cathode Ray Tube) display or an LCD (Liquid Crystal Display) can be used as the display 107. In addition, a display such as an SED (Surface-conduction Electron-emitter Display), an EL (Electro Luminescent) display, or the like may be used.

Reference numeral 108 refers to a sound device that processes, for example, audio data attached to image data, and transfers the resultant to a speaker.

Reference numeral 109 refers to a keyboard that has various keys for inputting characters and the like.

Reference numeral 110 refers to a pointing device, an example of which is a mouse. The pointing device 110 controls, for example, a mouse pointer displayed on the screen of the display 107 that is used to manipulate program menus and other objects.

Reference numeral 111 refers to a print device; an inkjet printer, a dye sublimation printer, and the like can be given as examples thereof. The print device 111 is used for printing content data, such as images or text saved in the HDD 103 or loaded from the removable drive 104, onto a paper medium.

Reference numeral 112 refers to a communication interface, enabling the sending and receiving of data to and from external devices. The PTP (Picture Transfer Protocol) standard, for example, is used by the communication interface 112.

(Configuration of Electronic Imaging Device (Digital Camera))

Figure 2:
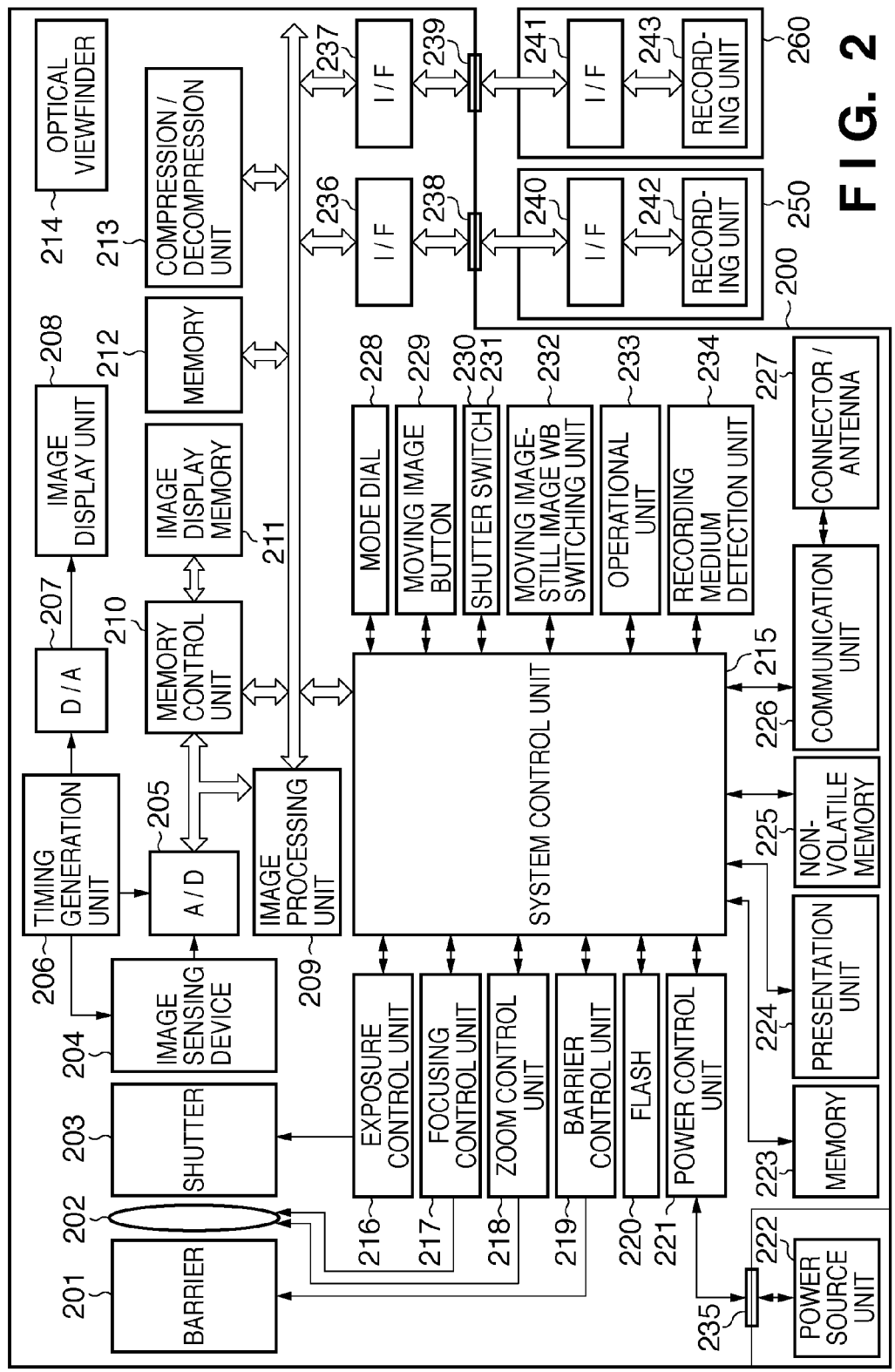
FIG. 2 is a block diagram illustrating an example of the configuration of a digital camera serving as an electronic imaging device according to an embodiment of the present invention.

FIG. 2 is a block diagram illustrating the configuration of an electronic imaging device (digital camera) 200 according to the present embodiment. In the digital camera 200, an optical image is formed upon an image sensing device 204 via an imaging lens 202 and a shutter 203 provided with aperture functionality. The image sensing device 204 converts the optical image into an electrical signal, and outputs an analog signal. A known sensor, such as a CCD or CMOS sensor, can be used as the image sensing device 204. An A/D converter 205 converts the analog signal outputted from the image sensing device 204 into a digital signal.

A timing generation unit 206 is controlled by a memory control unit 210 and a system control unit 215, and supplies clock signals, control signals, and so on to the image sensing device 204, the A/D converter 205, and a D/A converter 207. An image processing unit 209 performs a predetermined pixel interpolation process, color conversion process, and the like on digital data from the A/D converter 205 or on data from the memory control unit 210. The image processing unit 209 also performs predetermined computations using the captured image data, and supplies the results thereof to the system control unit 215. The system control unit 215 controls an exposure control unit 216 and a focusing control unit 217 based on the obtained computation results. A TTL (through-the-lens) AF (autofocus) process, an AE (autoexposure) process, and an EF (flash pre-emission) process are implemented thereby. The image processing unit 209 also performs predetermined computations using the captured image data, performing a TTL AWB (auto white balance) process based on the results thereof.

The memory control unit 210 controls the A/D converter 205, the timing generation unit 206, the image processing unit 209, an image display memory 211, the D/A converter 207, a memory 212, and a compression/decompression unit 213. The digital data from the A/D converter 205 is written into the image display memory 211 or the memory 212 as image data, via the image processing unit 209 and the memory control unit 210, or directly via the memory control unit 210.

The image data written into the image display memory 211 is displayed by an image display unit 208 via the D/A converter 207. The image display unit 208 is comprised of a TFT, an LCD, or the like. An electronic viewfinder function can be realized by sequentially displaying captured image data using the image display unit 208. The image display unit 208 can also have its display turned on and off arbitrarily under instructions from the system control unit 215. Turning the display of the image display unit 208 off can drastically reduce the power consumed by the digital camera 200. Therefore, turning the display of the image display unit 208 off when shooting using an optical viewfinder 214 makes it possible to save power.

Captured still images, moving images, and so on are stored in the memory 212. The memory 212 is provided with a storage capacity sufficient for storing a predetermined number of still images, a predetermined time's worth of moving images, and so on. It is thus also possible to quickly write large amounts of images into the memory 212, such as during continuous exposures, in which multiple images are shot in sequence, when shooting panoramas, and so on. It is furthermore possible to use the memory 212 as a work area for the system control unit 215.

The compression/decompression unit 213 compresses and decompresses image data using an ADCT (adaptive discrete cosine transform) or the like. The compression/decompression unit 213 imports the images stored in the memory 212 and performs a compression process or a decompression process thereon, and then writes the processed data back into the memory 212.

The exposure control unit 216 controls the aperture functionality of the shutter 203, and also implements flash dimmer functionality through cooperation with a flash 220. The focusing control unit 217 controls the focusing of the imaging lens 202. A zoom control unit 218 controls the zooming of the imaging lens 202. A barrier control unit 219 controls the operation of a barrier 201 serving as a protective member. Reference number 220 refers to a flash, and has functionality for flooding AF fill-in light, flash dimmer functionality, and so on in addition to the normal flash functions. The system control unit 215 controls the exposure control unit 216 and the focusing control unit 217 based on the results of computations performed by the image processing unit 209 on the captured image data. In this manner, the exposure control unit 216 and the focusing control unit 217 are controlled using the TTL system.

The system control unit 215 furthermore controls the entire digital camera 200. A memory 223 stores constants, variables, programs and so on used for the operation of the system control unit 215. The memory 223 also stores program diagrams used in AE. The "program diagrams" referred to here are tables that define the control value relationships between aperture diameters for exposure values and shutter speeds.

A presentation unit 224 presents operational states, messages, and the like to the user through characters, images, audio, and the like, in accordance with the execution of a program by the system control unit 215. The presentation unit 224 is comprised of a combination of a liquid-crystal display (LCD) or LED, for displaying various information, a speaker (audio-emitting device), and the like, and is provided, so as to be easily recognizable, in single location or multiple locations near the operation unit of the digital camera 200. Some of the functions of the presentation unit 224 are provided in the optical viewfinder 214. The following are examples of the details displayed by the presentation unit 224 in a display device or the like: a single shot/continuous exposure display; a self-timer display; and a compression rate display. Furthermore, a recorded resolution display, a display showing the number of recorded images, a display showing the remaining number of images that can be shot, a shutter speed display, an aperture value display, an exposure correction display, a flash display, a red-eye reduction display, and a macro shooting display may be included. Finally, a buzzer setting display, a display showing the remaining battery life for a clock, a display showing the remaining battery life, an error display, a multi-digit number information display, a display showing the mounting state of recording media 250 and 260, a display showing the operation of the communication I/F, and a date and time display may also be included. Meanwhile, the following can be given as examples of details displayed by the presentation unit 224 in the optical viewfinder 214: a focus display; an image stabilization notification display; a flash charge display; a shutter speed display; an aperture value display; an exposure correction display; and so on.

A non-volatile memory 225 is a memory that can be recorded to and deleted electrically, and is comprised of, for example, an EEPROM.

A mode dial switch 228, a moving image button 229, and a shutter switch 230 make up a user interface by which the user inputs various operational instructions into the system control unit 215. An operational unit 233 is configured of one or a combination of switches, dials, a touch panel, a pointing function that uses vision detection, a voice recognition device, or the like. The mode dial switch 228 is a switch for switching between various functional modes, such as power off, an automatic shooting mode, a shooting mode, a panoramic shooting mode, a playback mode, a multi-screen playback/delete mode, a PC connection mode, and so on. The moving image button 229 is a button for instructing the starting and stopping of moving image recording. In other words, depressing the moving image button 229 when a moving image is not being recorded starts the moving image recording, whereas depressing the moving image button 229 when a moving image is being recorded stops the moving image recording.

Reference number 230 refers to a shutter switch (SW1), and is switched on when a shutter button (not shown) is pressed partway. The system control unit 215 commences operations such as AF (autofocus) processes, AE (autoexposure) processes, AWB (auto white balance) processes, and EF (flash pre-emission) processes when the shutter switch 230 is turned on.

Reference number 231 is a shutter switch (SW2), and is switched on when a shutter button (not shown) is pressed fully. The system control unit 215 executes a series of processes for shooting, or in other words, an exposure process, a development process, and a recording process, when the shutter switch 231 is turned on. In the exposure process, a signal read out from the image sensing device 204 is written into the memory 212, via the A/D converter 205 and the memory control unit 210, as digital data. In the development process, the image processing unit 209, the memory control unit 210, and the like perform computations on the digital data, resulting in the acquisition of digital image data, which is then written into the memory 212. Finally, in the recording process, image data is record out from the memory 212, compressed by the compression/decompression unit 213, and then written into the recording medium 250 or 260.

A moving image-still image WB switching unit 232 provides a user interface for setting WB operations for still image shooting during moving image shooting. In the present embodiment, a single mode can be selected from among three types of modes, or a color reproduction priority mode, a moving image priority mode, and a still image priority mode.

The operational unit 233 is made up of various buttons, a touch panel, and so on. For example, the following buttons are provided: a menu button; a set button; a macro button; a multi-screen playback page change button; a flash settings button; a single shot/continuous shot/self timer switch button; a menu shift + (plus) button; a menu shift − (minus) button. Furthermore, a playback image shift + (plus) button, a playback image shift − (minus) button, a shooting quality selection button, an exposure correction button, and a date/time setting button are also provided.

A power control unit 221 is configured of a battery detection circuit, a DC-DC converter, switch circuits for switching the blocks through which power passes, and so on. With such a configuration, the power control unit 221 detects the presence/absence of a battery, the type of battery, and the remaining battery life, controls the DC-DC converter based on the detection results and instructions from the system control unit 215, and supplies the necessary voltage for the necessary period to the various units, including the recording medium.

The power control unit 221 is connected to a power source unit 222 via a connector 235. Primary batteries such as alkali batteries and lithium batteries, secondary batteries such as BNiCd batteries, NiMH batteries, Li batteries, and an AC adapter can be used as the power source unit 222.

Interfaces 236 and 237 connect recording media such as memory cards and hard disks to an internal bus. Connectors 238 and 239 are connectors that make connections to recording media such as memory cards and hard disks. A recording medium detection unit 234 detects whether or not various recording media are mounted to each of the connectors 238 and 239.

Note that the present embodiment is described as having two interface/connector systems with which to mount recording media. Of course, both a single interface/connector system for mounting a recording medium and multiple interface/connector systems for mounting recording media may be provided. The configuration may provide any number of such systems. The configuration may furthermore provide combinations of interfaces and connectors of differing standards. The configuration may further use interfaces and connectors compliant with standards such as the PCMCIA card standard, the CF (Compact Flash®) card standard, and so on.

Moreover, mounting a communication card in the connector 238 or 239 makes it possible to exchange image data, management information attached to the image data, and so on with peripheral devices such as other computers, printers, and so on. Standards such as the PCMCIA card standard, the CF (Compact Flash®) card standard, and so on can be given as examples of the interfaces 236 and 237 and connectors 238 and 239 that realize such communication. In addition, LAN cards, modem cards, USB cards, IEEE 1394 cards, P1284 cards, SCSI cards, and PHS can be given as other examples of communication cards used in such a case.

The barrier 201 prevents an imaging unit, including the imaging lens 202 of the digital camera 200, from being soiled or damaged by covering that imaging unit. The optical viewfinder 214 makes it possible to shoot without using the electronic viewfinder function provided by the image display unit 208. In addition, as described above, the optical viewfinder 214 is provided with some of the functions of the presentation unit 224, such as, for example, a focus display, an image stabilization notification display, a flash charge display, a shutter speed display, an aperture value display, and an exposure correction display.

A communication unit 226 is provided with various communication functions such as RS-232C, USB, IEEE 1394, P1284, SCSI, modems, LANs, wireless communication, and so on. A connector/antenna 227 is a device for connecting the digital camera 200 to another device using the communication unit 226, and is a connector when using a hard-wired connection and an antenna when using a wireless connection.

The recording media 250 and 260 are memory cards, hard disks, or the like. The recording media 250 and 260 respectively include the following: recording units 242 and 243, configured of semiconductor memories, magnetic disks, or the like; interfaces 240 and 241, interfacing with the digital camera 200; and the connectors 238 and 239 for connecting to the digital camera 200. Note that although the recording media 250 and 260 are described in the present embodiment as being devices that are removable from the camera 200, they may also be unremovably installed in the camera 200.

It is assumed, in the above-described hardware configuration, that image data is saved in advance in the removable recording medium 250 and/or 260. Furthermore, the program that controls this digital camera 200 is stored in the non-volatile memory 225, is expanded in the memory 223, and is executed by the system control unit 215. For example, the system control unit 215 performs control so that the image data stored in the removable recording media 250 and 260 is loaded and then played back and displayed by the image display unit 208.

Note that although a compact digital camera capable of shooting moving images is employed as the digital camera 200 in the present embodiment, a digital single-lens reflex camera or the like may be used as well.

(Configuration of Device Connection)

Figure 3:
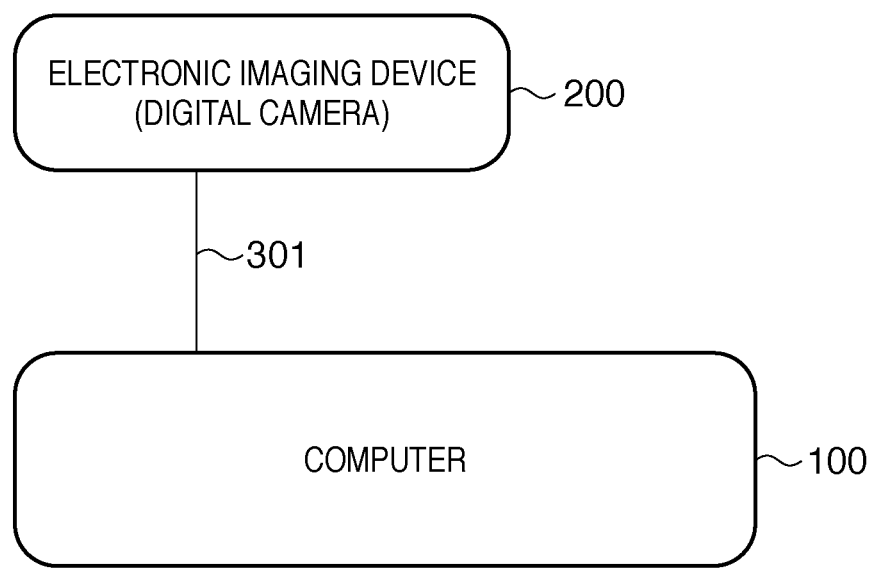
FIG. 3 is a block diagram illustrating an example of a configuration in which the computer and the digital camera have been connected to each other according to an embodiment of the present invention.

FIG. 3 is a block diagram illustrating an example of a configuration in which the computer 100 and the digital camera 200 have been connected to each other according to the present embodiment.

In FIG. 3, the computer 100 is as described with reference to FIG. 1. Meanwhile, the electronic imaging device 200 is as described with reference to FIG. 2.

Reference number 301 refers to a communication cable. Any cable may be used as long as it can send and receive data in accordance with PTP. For example, a USB (Universal Serial Bus) cable can be used. Instead of a hard-wired connection, the computer 100 and the digital camera 200 may also be connected through a wireless interface compliant with, for example, IEEE 802.11x (where x is a, b, g, or the like).

The present embodiment employs a scheme in which the communication interface 112 of the computer 100 is connected to the communication unit 226 of the digital camera 200 using a USB cable, and data is exchanged between the two through communication based on the PTP (Picture Transfer Protocol) standard.

Meanwhile, a program that enables communication with the digital camera 200 based on the PTP standard is installed in the HDD 103 of the computer 100 in the present embodiment. Image data is furthermore assumed to be saved in the HDD 103, or saved in advance in the recording units 242 and 243. The image data in the HDD 103 and the image data sent from the digital camera 200 to the computer 100 is loaded into the RAM 102, and is then displayed by the CPU 101. In this manner, the computer 100, serving as an information processing apparatus, functions as an image processing apparatus.

Furthermore, the present embodiment assumes an image processing apparatus capable of playing back Exif JPEG images generated by shooting performed by the digital camera. Although the descriptions primarily discuss thumbnail images of the images being acquired and displayed, the concept of the present embodiment can also be applied in the case where Exif information of the image files is acquired and displayed instead of the thumbnail images. "Exif information" refers to information based on the EXIF standard included in the header of the image file; such information includes the number of pixels of the image, the shooting date and time, and so on.

(Interface of the Image Processing Apparatus)

Figure 4:
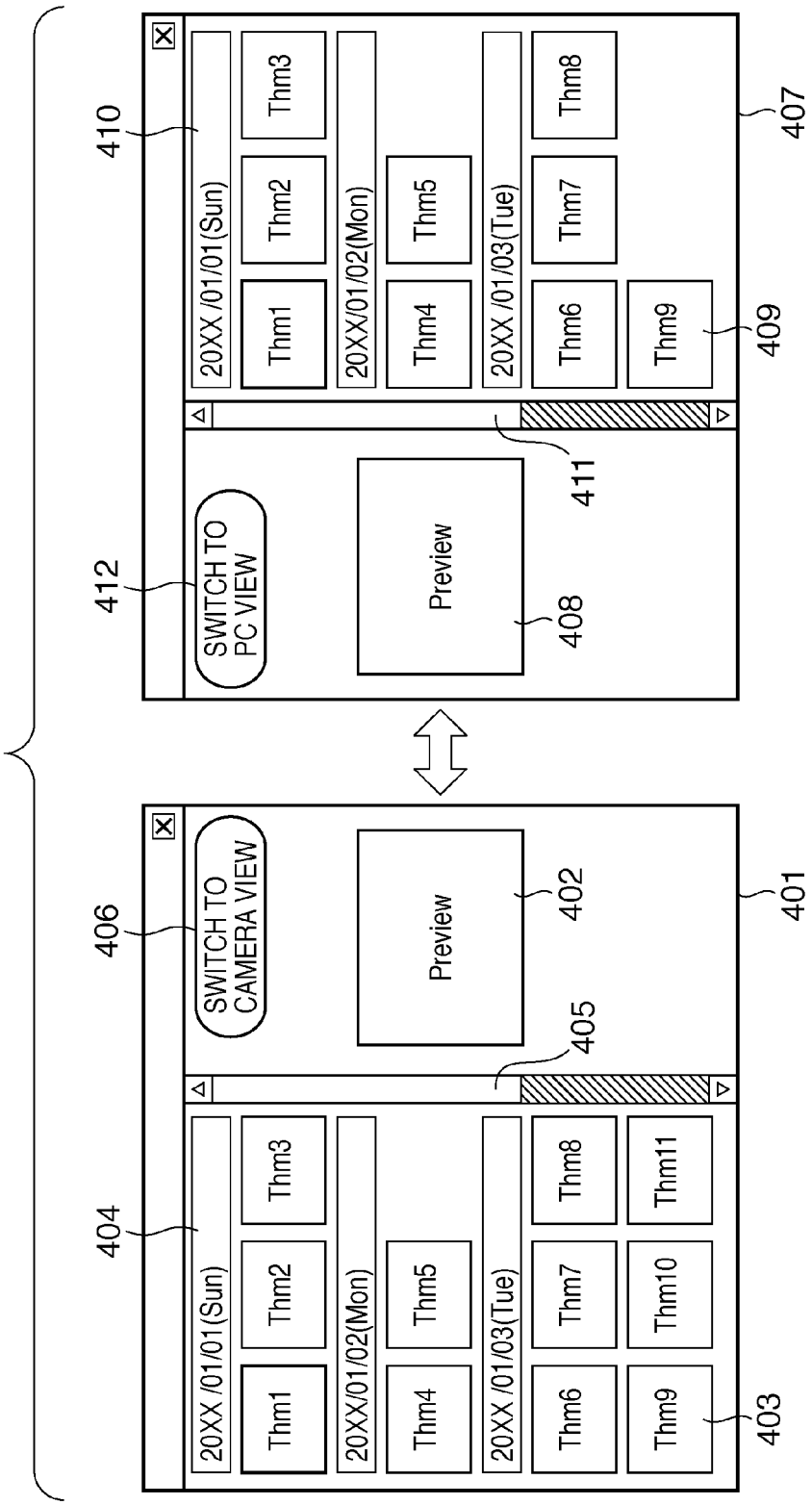
FIG. 4 is a diagram illustrating an example of a user interface of the image processing apparatus according to an embodiment of the present invention.

FIG. 4 is a diagram illustrating an example of a user interface of the image processing apparatus according to the present embodiment.

The image processing apparatus of the present embodiment is assumed to be capable of displaying the images located in the computer 100 and the images located within the digital camera 200. Furthermore, a view in which thumbnail images corresponding to the image files stored in the digital camera 200 are arranged is called a first view, whereas a view in which thumbnail images corresponding to the image files stored in the computer 100 are arranged is called a second view.

Reference number 401 refers to a view displaying the images saved in the computer 100 (the second view). The second view 401 is configured in a two-pane structure that includes two areas:
- one pane has an area for displaying a preview image 402 (a preview display area), which is a display format that displays images at a large size, and is thus suitable for confirming the details of images; and
- the other pane has an area for displaying multiple thumbnail images 403 (a thumbnail image display area), which is a display format suitable for browsing multiple images at a time.

Reference number 402 refers to a preview image. "Preview image" refers to a single image, selected from a group of images within the device that are to be displayed, to be displayed at the maximum size allowed by the preview display area.

Reference number 403 refers to thumbnail images. "Thumbnail image" refers to a display format in which images in the device that are to be displayed (played back) are displayed at a small size. The present embodiment assumes an operation for displaying images to be displayed in the thumbnail display region in order, starting with older shooting dates and times and progressing to newer shooting dates and times.

Reference number 404 refers to a date display. The thumbnail images 403 are categorized by the date indicated in the date display 404, and the thumbnail images corresponding to a particular date are displayed in the appropriate date category.

Reference number 405 refers to a scroller. The scroller 405 is displayed in the case where the thumbnail images 403 do not fit within the display area of the second view 401. By sliding the scroller 405 using the pointing device 110, hidden thumbnail images can be displayed.

In the present embodiment, when an arbitrary thumbnail image is selected using the pointing device 110, a preview image of the selected image is displayed as the preview image 402.

Reference number 406 refers to a view switch button. The images saved in the computer 100 are displayed in the second view 401, but this button is used when the user wishes to switch to the view that displays the images saved in the digital camera 200 (a first view 407).

Reference number 407 refers to the view for displaying the images saved in the digital camera. Like the second view 401, the first view 407 is configured in a two-pane structure.

Reference number 408 refers to a preview image. Reference number 409 refers to a thumbnail image. Reference number 410 refers to a date display. Reference number 411 refers to a scroller. The details of these items are the same as those of the second view 401 that displays the images Stored in the PC.

Reference number 412 refers to a view switch button. The first view 407 is a view for displaying the images saved in the digital camera 200, but this button is used when the user wishes to switch to the view that displays the images saved in the computer 100.

Note that although the present embodiment assumes a scheme in which the view is switched by pressing the view switch buttons 406 and 412, a scheme in which a view switch button is not provided and both views are displayed simultaneously may also be used.

(Sequence up to Display of Images Saved in Computer)

Figure 5:
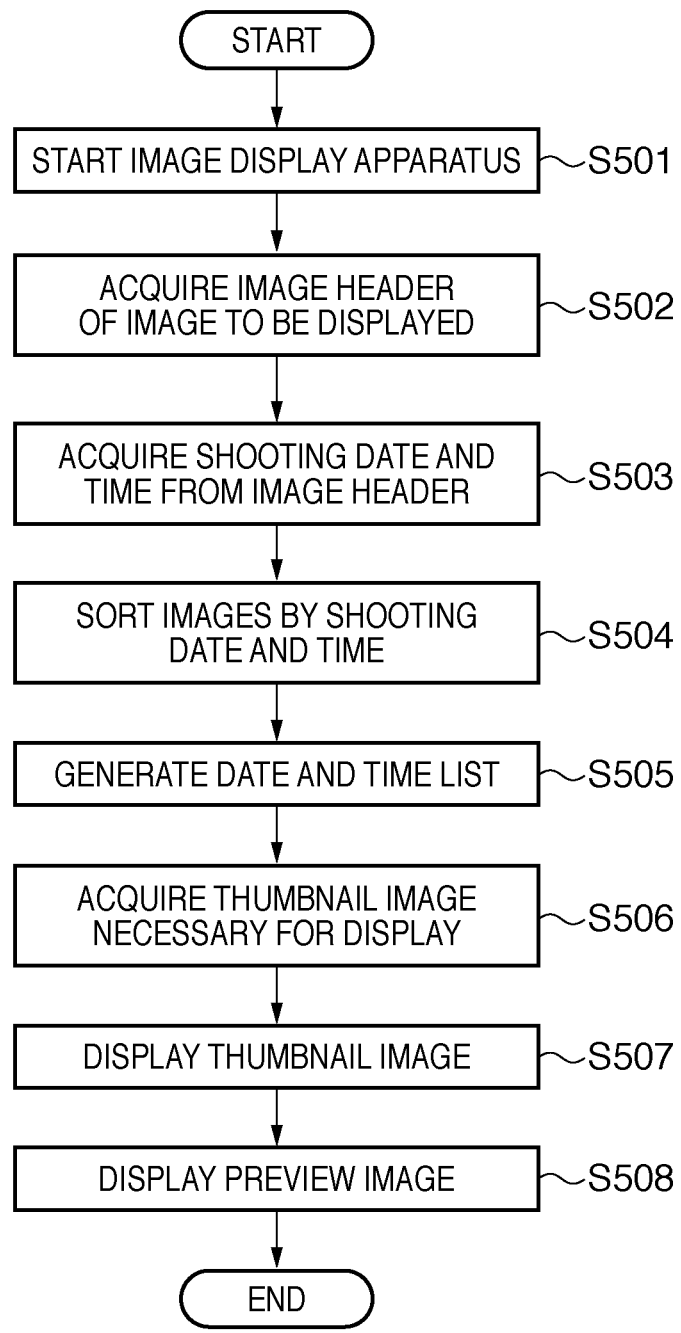
FIG. 5 is a flowchart illustrating a process for displaying images saved in the computer in a PC view.

Next, a sequence according to the present embodiment, extending up until the images saved in the computer are displayed, shall be described. FIG. 5 is a flowchart illustrating a process for displaying images saved in the computer according to the present embodiment.

In Step S501, the image processing application (an application for image processing, including image display) is started up. In the present embodiment, the computer 100 functions as the image processing apparatus of the present embodiment by its CPU 101 executing a program that has been loaded, along with programs and image data and so on recorded in the HDD 103, into the RAM 102. Furthermore, the paths of the areas in which the image data to be displayed in the image display device are saved are registered in advance, and the appropriate paths are automatically loaded each time the device starts up. In the present embodiment, the paths of the areas in which the images are saved are fixed, but the images to be displayed may be changed by the user specifying the file paths of images while the image processing apparatus is started up.

In Step S502, the CPU 101 acquires the image header (also sometimes called simply a "header") of the image to be displayed. Here, descriptions shall be provided regarding the image header itself and a method for acquiring the image header, with reference to FIG. 6.

Figure 6:
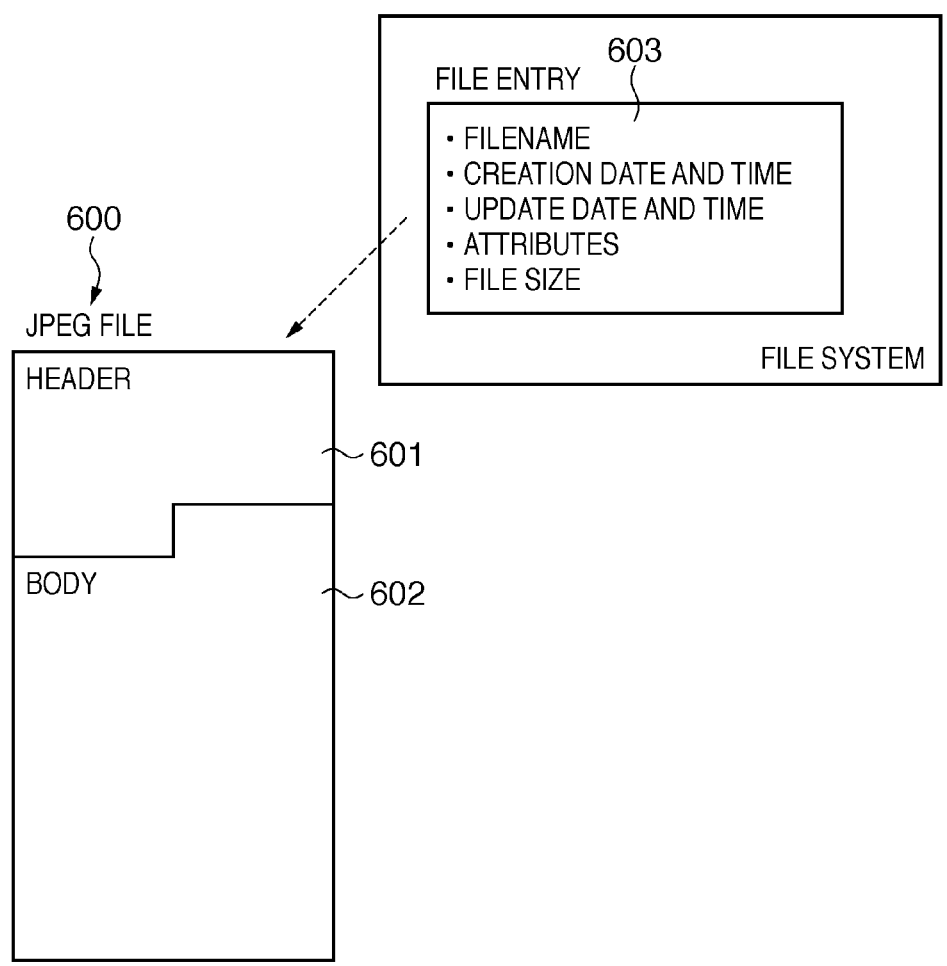
FIG. 6 is a diagram illustrating an example of the data structure of a JPEG file.

In FIG. 6, reference number 600 refers to a JPEG (Joint Photographic Experts Group) file, made up of an image header 601 and a body 602. Additional information, such as information regarding the image data stored in the file, is stored in the image header 601, whereas the image data itself is stored in the body 602. In addition, information regarding the number of pixels of the image, the shooting date and time, and a thumbnail image showing the body image at a reduced size are also stored in the image header 601 based on the Exif standard. A file entry 603 is a set of parameters described in the file system. The file entry 603 indicates file entry portions of the JPEG file 600, and is information recorded in a management area of the recording medium for performing file management. The following can be stored in the file entry 603 as its constituent elements: a file name; the creation date and time of the file; the last update date and time of the file; file attributes; the file size; and so on. Note that although the present embodiment discusses a JPEG-format file as an example of the image file, the same descriptions apply to other image, moving image, and audio files as long as those files have a similar structure.

In Step S502, the image header 601, described above, is acquired.

Then, in Step S503, the CPU 101 acquires the shooting date and time from the image header 601. As described earlier, the shooting date and time is recorded in the image header, and only this shooting date and time information is acquired from the image header.

In Step S504, the CPU 101 uses the shooting date and time acquired in Step S503 to sort the images by their shooting date and time. In the present embodiment, a process for sorting the images to be played back in descending order, from old shooting dates and times to new shooting dates and times, is performed. Any known algorithm may be used as the sorting algorithm. Examples include bubble-sort and heap-sort. These sorting algorithms are well-known and thus descriptions thereof shall be omitted.

In Step S505, the CPU 101 generates a shooting date and time list. FIG. 7 is a diagram illustrating an example of the data structure of the shooting date and time list, serving as a second sorting result. Because sorting the image data itself is inefficient, in the present embodiment, IDs are prepared in advance for the images to be played back; the image IDs and shooting dates and times are associated with each other and displayed as a list. The file name, for example, can be used as the image ID.

In Step S506, the CPU 101 determines the thumbnail images necessary for display from the date and time list, and acquires those thumbnails by reading them out from the HDD 103. Although the CPU 101 sorts all the images that are to be displayed in Step S505, the number of thumbnail images that can actually be displayed in the second view 401 is limited. Accordingly, only the thumbnail images that will fit in the image display area of the second view 401 are acquired in Step S506. Note that the image included in the image header acquired in Step S502 is used as the thumbnail image.

In Step S507, the CPU 101 displays the thumbnail image acquired in Step S506 in the thumbnail display area of the second view 401 in the order corresponding to the shooting date and time. Finally, in Step S508, the CPU 101 displays one of the thumbnail images acquired in Step S506 in the preview display area of the second view 401 as the preview image, after which the process ends.

The above is a description of a sequence performed up until an image is displayed in the view for displaying images saved in the computer 100.

(Sequence up to Display of Images Saved in Digital Camera)

Figure 8:
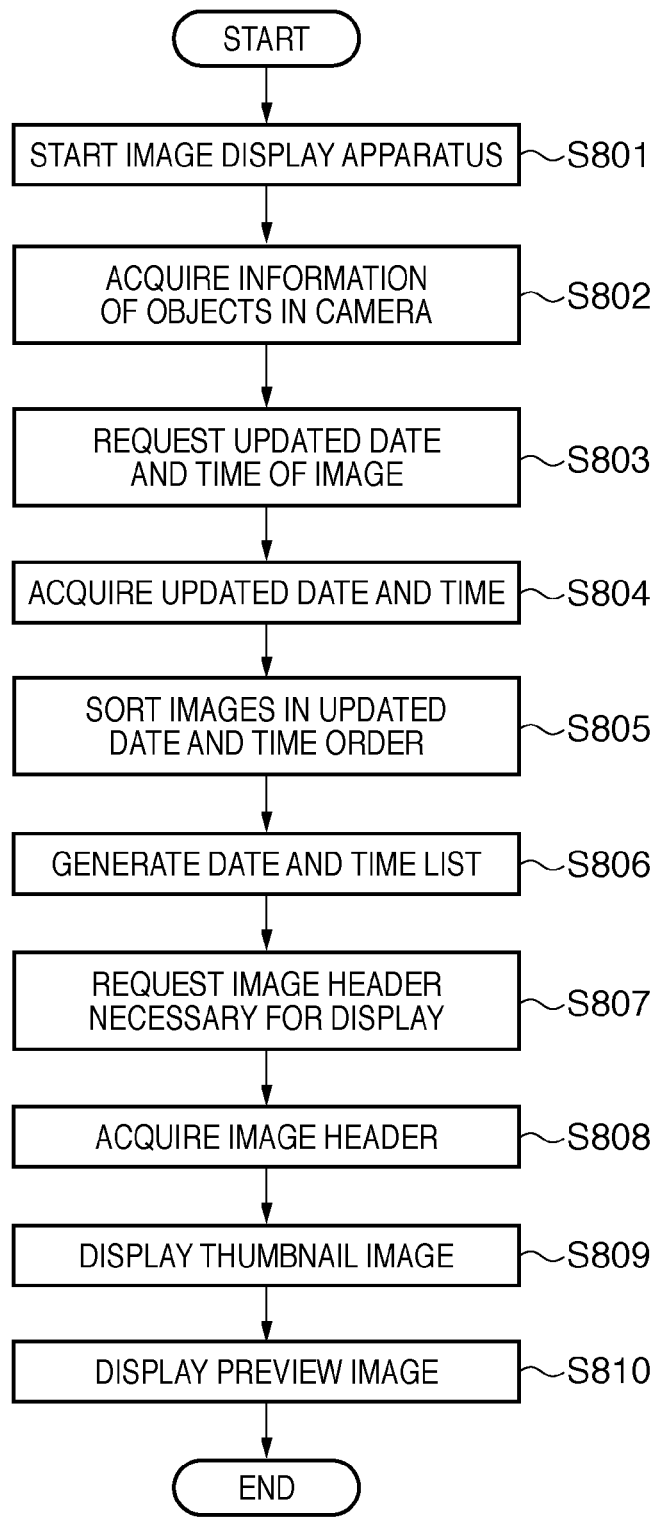
FIG. 8 is a flowchart illustrating a process for displaying images saved in the digital camera in a camera view.

Next, a sequence extending up until the images saved in the digital camera 200 are displayed in the image processing apparatus of the present embodiment shall be described. FIG. 8 is a flowchart illustrating a process by which the image processing apparatus of the present embodiment displays the images saved in the digital camera.

In Step S801, the image processing application (an application for image processing, including image display) is started up. As described above, in the present embodiment, the computer 100 functions as the image processing apparatus of the present embodiment by its CPU 101 executing a program that has been recorded in the HDD 103, and loaded into the RAM 102. The following is a description of a process performed in the case where images saved in the digital camera 200 that is connected to the computer 100 are displayed on the computer 100.

In Step S802, the CPU 101 acquires object information within the digital camera 200. The folder tree structure of the recording units 242 and 243 of the digital camera 200, information of the images saved in those folders, and so on are acquired in this step.

In Step S803, the CPU 101 makes a request to the digital camera 200 for the updated date and time of the images to be displayed in the image processing apparatus. In step S803, the computer 100 requests the digital camera 200 for the updated date and time of the file entry 603, based on the PTP standard. In response to this request, the digital camera 200 sends the updated date and time from the file entry 603 to the computer. Note that as described with reference to FIG. 6, the file entry 603 is a set of parameters described in the file system within the digital camera 200, and is managed separately from the JPEG file (image file).

In Step S804, the CPU 101 acquires the updated date and time described in the file entries 603 from the digital camera 200. In Step S804, the updated date and time information sent from the digital camera in Step S803 is received by the computer 100, based on the PTP standard.

In Step S805, the CPU 101 sorts the images in order, by their updated dates and times. In the present embodiment, a process for sorting the images to be played back in descending order, from old updated dates and times to new updated dates and times, is performed. Any known algorithm may be used as the sorting algorithm. Examples include bubble sorting and heap sorting. These sorting algorithms are well-known and thus descriptions thereof shall be omitted.

In Step S806, the CPU 101 generates an updated date and time list such as that shown in, for example, FIG. 9, as the first sorting result. In order to sort the image data itself, it is necessary to receive the image data from the digital camera 200; because this is extremely inefficient, image IDs are prepared in advance for each image based on the acquired object information, and the image IDs and updated dates and times are associated with each other and displayed as a list. The file name, for example, can be used as the image ID.

In Step S807, the CPU 101 makes a request to the digital camera 200 for the image headers necessary for image display. In this step, the CPU 101 requests that the digital camera 200 send, to the computer 100, the image header 601 of the JPEG file for the image that is to be displayed in the device, based on the PTP standard. Note that because the number of thumbnail images that can actually be displayed in the thumbnail display area of the first view 407 is limited, only the thumbnail images that will fit in the thumbnail display area are acquired here.

In Step S808, the CPU 101 acquires the image header requested in Step S807 from the digital camera 200. In this step, the image header sent from the digital camera 200 is received by the computer 100, based on the PTP standard.

In Step S809, the CPU 101 displays the thumbnail image in the thumbnail display area of the first view 407 in the order corresponding to the updated date and time. In other words, the CPU 101 performs a process for displaying the thumbnail image included in the image header acquired in Step S808 in the thumbnail display area of the first view 407.

Finally, in Step S810, the CPU 101 displays one of the multiple thumbnail images, displayed in the thumbnail display area, in the preview display area of the second view 401 as the preview image, after which the process ends.

Although not explicitly described here, it should be noted that in the present embodiment, the CPU 101 makes a request to the digital camera 200 for the image headers of images that could not be displayed in the thumbnail display area and acquires those image headers upon the process ending at Step S810. In such a manner, display preparations are made for the case where those images have entered the display area through the manipulation of the scroller 411. This series of processes is executed in the background.

The above is a description of a sequence performed up until an image is displayed in the first view 407 for displaying images saved in the digital camera 200.

As described thus far, according to the present embodiment, in the case where images saved in the digital camera are to be sorted in order by their shooting dates and times and displayed, the updated dates and times in the file entries are used for the sorting, rather than the shooting dates and times described in the image headers. The file entry information can be sent from the digital camera to the computer at a higher speed than the information included in the image header. For this reason, according to the present embodiment, when sorting images saved in the digital camera in order by their shooting dates and times and displaying those images, the sorting process can be carried out quickly, and the images can be displayed.

Note that the updated date and time and the shooting date and time essentially match at the time of shooting, which can be given as a reason why the updated dates and times of the images saved in the digital camera can be substituted for the shooting dates and times. Furthermore, because there are few cases where the digital camera 200 updates files of images it has captured, there are also situations where the updated dates and times are not changed after the time of shooting. However, it is highly likely that images saved in a computer will be displayed and edited by multiple programs, resulting in mismatches between the updated dates and times and shooting dates and times of files; accordingly, using the updated date and time as a substitute for the shooting date and time is unreliable. Furthermore, the process for acquiring the header of an image saved in the computer takes comparatively less time than the process for acquiring the header of an image saved in the digital camera, and therefore the shooting date and time results are used for images saved in the computer.

(Processing for when Updated Date and Time and Shooting Date and Time do not Match (Update when Changing Display Area))

The embodiment as described thus far assumes a case in which images saved in the digital camera have not been updated since they were originally shot; however, a case in which some sort of editing has been performed on the images stored in the camera can also be considered. In this case, performing the processing according to the embodiment as described thus far will result in a problem in which the results of sorting by updated date and time differ from the results of sorting by shooting date and time. The following describes a process conceived for the case where such images are saved in the camera.

FIG. 10 is a diagram illustrating an example of a list of images saved in the digital camera 200. As shown in FIG. 10, the shooting dates and times and updated dates and times of IMG_0001 and IMG_0004 differ. Accordingly, if the images are sorted in order from the oldest to the newest images based on the shooting dates and times, IMG_0001, IMG_0002, IMG_0003, IMG_0004, and IMG_0005 will be displayed in that order. However, if the images are sorted in order from the oldest to the newest images based on the updated dates and times, IMG_0002, IMG_0003, IMG_0005, IMG_0001, and IMG_0004 will be displayed in that order. Therefore, the process illustrated in FIG. 11 is performed to avoid such a situation.

Figure 11:
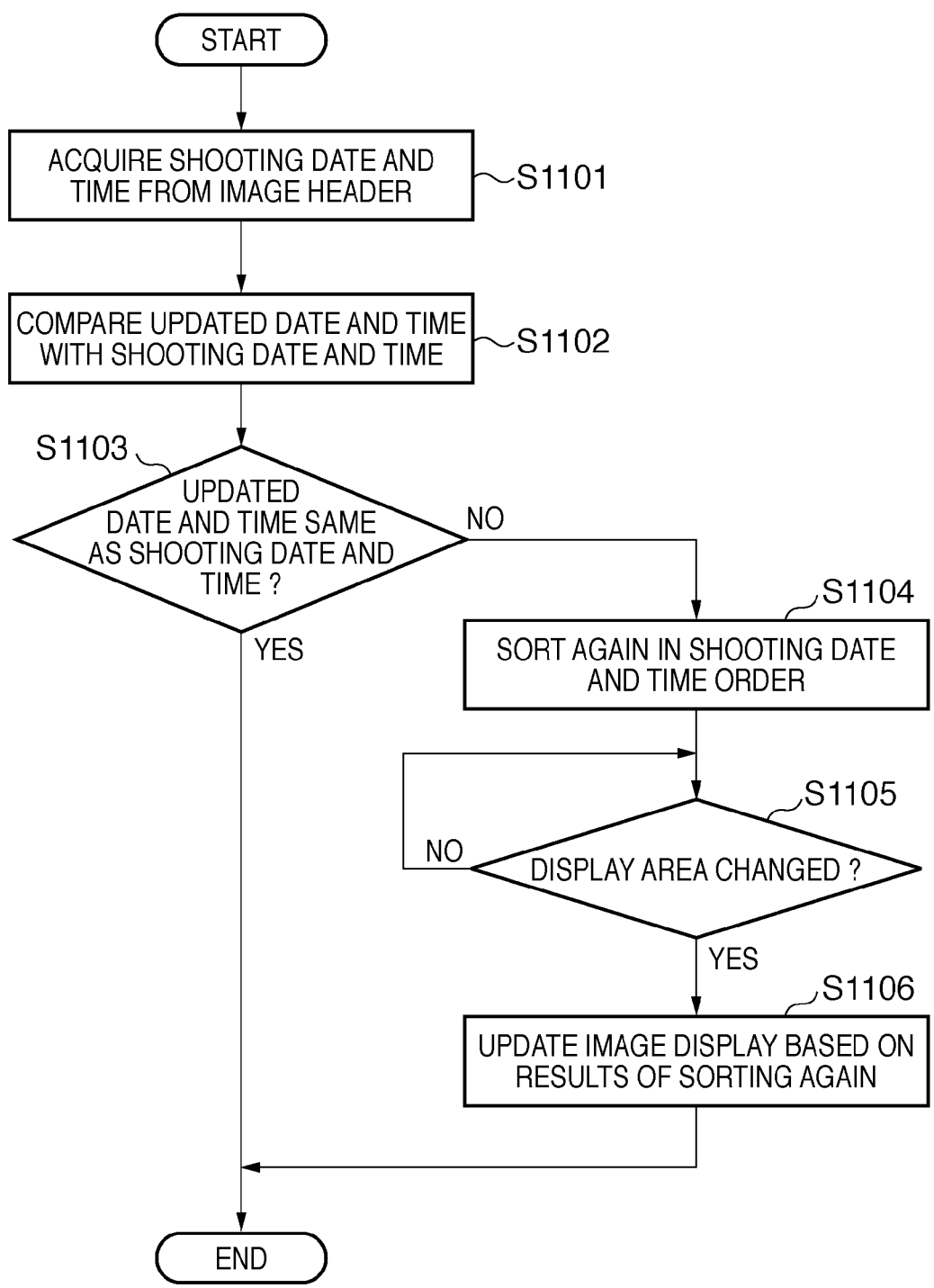
FIG. 11 is a flowchart illustrating a process performed in the case where the updated date and time and the shooting date and time do not match.

FIG. 11 is a flowchart illustrating a process performed in the case where the sorting results based on the updated date and time and the shooting date and time, respectively, do not match. Note that the process illustrated in this flowchart is assumed to be carried out after the process illustrated in FIG. 8 has ended.

In Step S1101, the CPU 101 acquires the shooting date and time from the image header. Here, the image header acquired when the thumbnail image of the image saved in the digital camera 200 was acquired in the flowchart of FIG. 8 is analyzed, and the shooting date and time is acquired.

In Step S1102, the CPU 101 compares the shooting date and time of the image file acquired in Step S1101 with the updated date and time of that image file as acquired in Step S804 of FIG. 8. In Step S1103, the CPU 101 ends the process without further action in the case where the results of the comparison indicate that the shooting date and time and the updated date and time are the same.

However, in the case where the results of the comparison performed in Step S1103 indicate that the updated date and time and the shooting date and time are not the same, the process advances to Step S1104. In Step S1104, the CPU 101 sorts the images again in order of their shooting dates and times. In other words, the date and time list (see FIG. 9) generated in Step S806 of FIG. 8 is updated.

In Step S1105, the CPU 101 determines whether the display area has been changed. In the case where an image located in the non-displayed area of the display device is shifted to the displayed area, the display order of the images is changed in Step S1106 based on the results of the sorting performed again in Step S1104. Note that in the case where the images displayed in the display area at the time of the determination in Step S1105 are first moved to the non-displayed area and are then returned to the displayed area, those images are displayed in the shooting date and time order. This is to avoid imparting a sense of unnaturalness to the user caused by a sudden change in the order of the displayed images.

By performing the process as described above, in the present embodiment, it is possible to change the order in which images are displayed in the shooting date and time order even in the case where the updated dates and times and shooting dates and times of the images stored in the camera do not match, without imparting a sense of unnaturalness.

(Processing for when Updated Date and Time and Shooting Date and Time do not Match (Update when Changing View))

In the embodiment as described thus far, the result of sorting the shooting dates and times again was applied using the timing at which the image display area was updated as a trigger, but the invention is not limited thereto. For example, because the present embodiment is configured so that the display can be switched between the PC view (the second view 401) and the camera view (the first view 407), it is also possible to use such a view switch as a trigger. For example, in the case where the user is manipulating the PC view, the images displayed in the camera view can be sorted again through a background process, and the result of this sorting can be applied to the image display when switching from the PC view to the camera view. Such a structure makes it possible to avoid problems in the case where the updated dates and times differ from the shooting dates and times.

Figure 12:
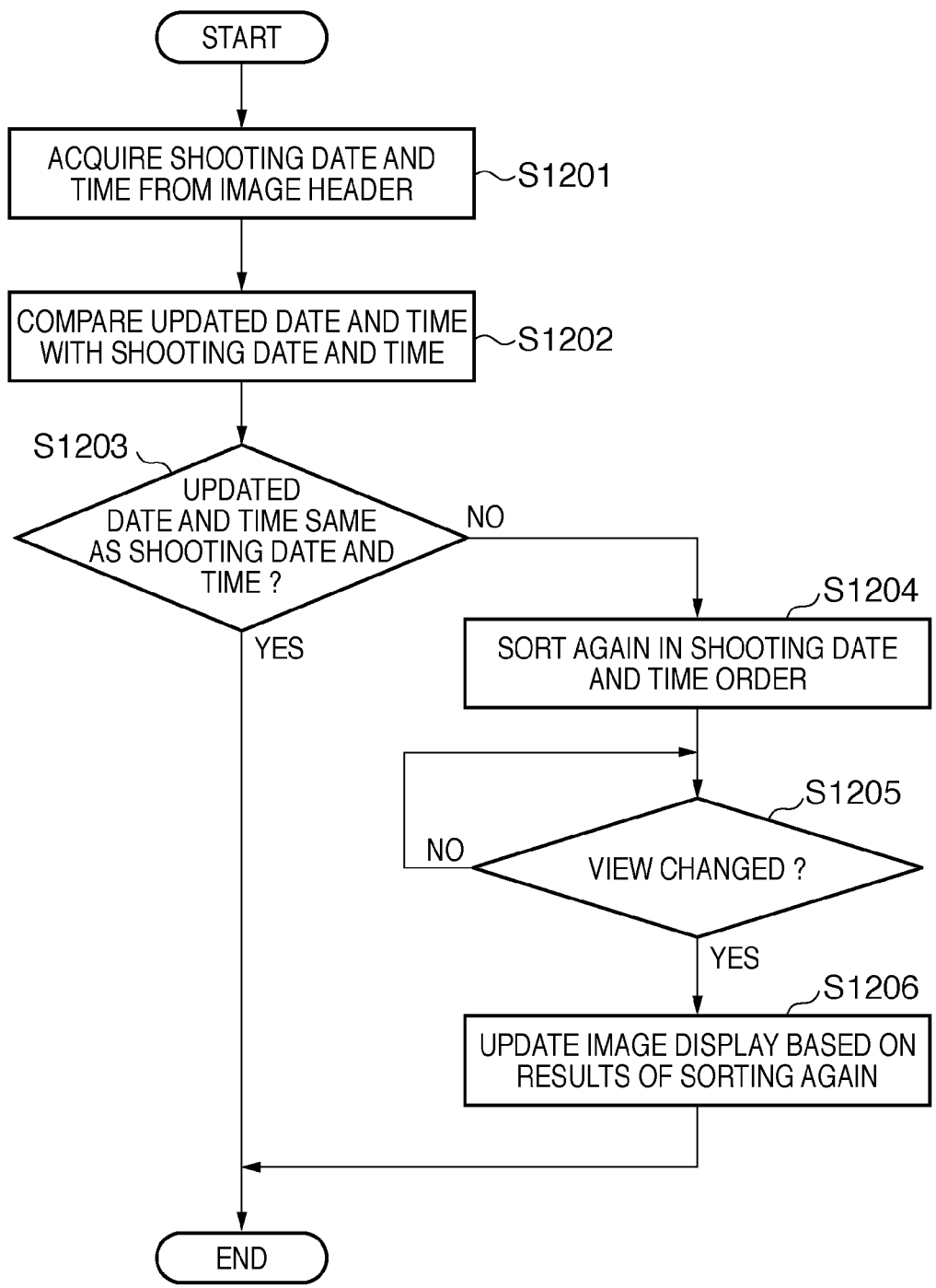
FIG. 12 is a flowchart illustrating another process performed in the case where the updated date and time and the shooting date and time do not match.

FIG. 12 is a flowchart illustrating a process that applies the result of sorting again in response to the view being switched, performed in the case where the updated date and time order and the shooting date and time order do not match. Note that the process illustrated in this flowchart is assumed to be carried out after the process illustrated in FIG. 8 has ended. Furthermore, the following process is performed in the background while the user browses the images displayed in the PC view (the second view 401), after the process of FIG. 8 has ended and the view switch button 412 has been pressed.

First, in Step S1201, the CPU 101 acquires the shooting date and time from the image header. Because the headers of the images stored in the digital camera 200 have already been acquired in Step S808 of FIG. 8, the CPU 101 analyzes those image headers, and acquires the shooting dates and times.

In Step S1202, the shooting dates and times acquired in Step S1201 are compared with the updated dates and times of the image files as acquired in Step S804 in FIG. 8. In Step S1203, the process ends without further action in the case where the results of the comparison indicate that the dates and times are the same.

However, in the case where the updated dates and times and the shooting dates and times are not the same, the process advances to Step S1204. In Step S1204, the CPU 101 sorts the images again in order of their shooting dates and times. In other words, the date and time list (see FIG. 9) generated in Step S806 of FIG. 8 is updated.

In Step S1205, the CPU 101 determines whether the view switch button 412 has been pressed and the view has been changed to the camera view. In the case where the display of the image processing apparatus has been changed to the camera view, the process advances to Step S1206. In Step S1206, the CPU 101 changes the display order of the images based on the result of the sorting performed in Step S1204, and displays thumbnails in the thumbnail display area in accordance with the changed display order.

Figure 13:
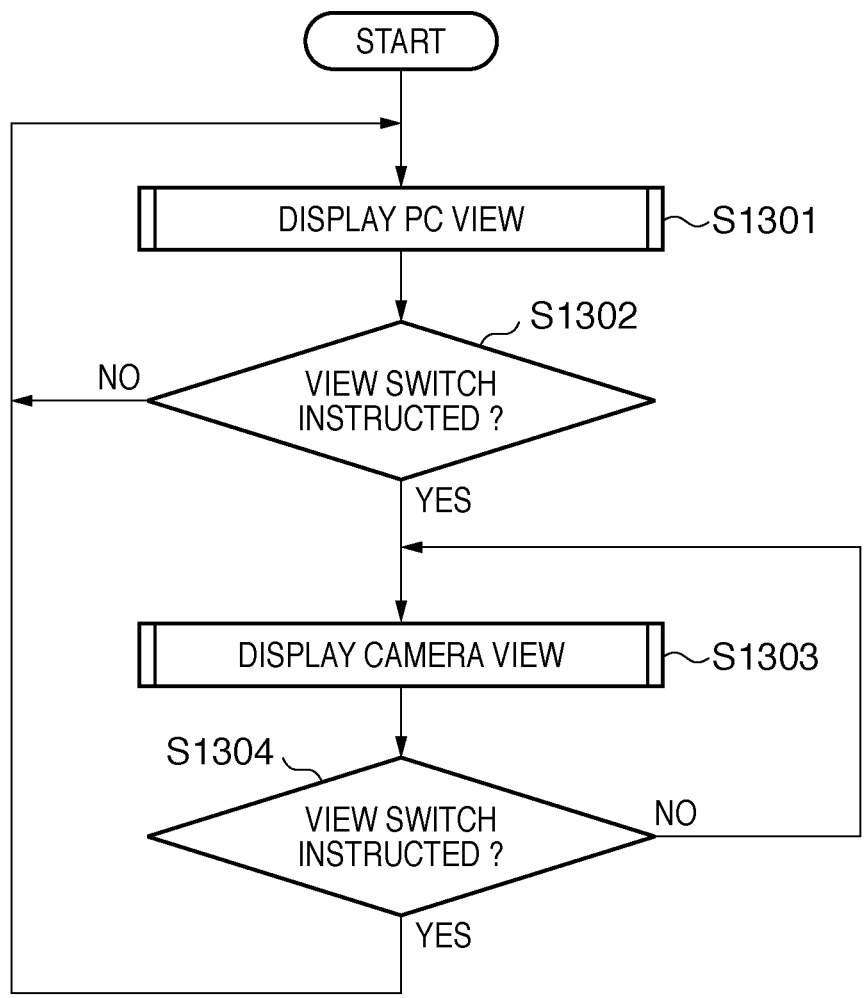
FIG. 13 is a flowchart illustrating display processes for the PC view and the camera view according to an embodiment of the present invention.

FIG. 13 is a flowchart illustrating display processes for the PC view and the camera view according to the present embodiment as described thus far. In Step S1301, when the image display process is started by the computer 100, the CPU 101 performs the PC view (second view 401) display through the process illustrated in FIG. 5. Then, in Step S1302, the CPU 101 determines whether or not the view switch button 406 has been operated. If the view switch button 406 has not been operated, the PC view display is continued according to the process of FIG. 5. In the case where the scroller 405 is manipulated during the PC view display, the display in the thumbnail display area is changed in accordance with the list shown in FIG. 7. This is to avoid imparting a sense of unnaturalness to the user caused by a sudden change in the order of the displayed images.

If, however, the view switch button 406 has been operated, the process advances to Step S1303, where the CPU 101 commences the camera view (first view 407) display illustrated in FIG. 8. Note that the processes of Steps S801 to S807 shown in FIG. 8 may be executed in the background while the PC view display of Step S1301 is being performed. Then, in Step S1304, the CPU 101 determines whether or not the view switch button 412 has been operated. If the view switch button 412 has not been operated, the camera view display is continued through the processing shown in FIG. 8. In the case where the scroller 411 is manipulated during the camera view display, the display in the thumbnail display area is updated in accordance with the list shown in FIG. 9.

The processing shown in FIG. 13 ends when an end operation has been made to end the image display process. Note that in the process of FIG. 8, the header information of the image file is acquired, and the body of the image file is then acquired when the thumbnail thereof has been specified. Alternatively, the bodies of the image files can be acquired sequentially after the header information of all the image files has been acquired.

By performing the process as described above, in the present embodiment, it is possible to change the order in which images are displayed in the shooting date and time order even in the case where the updated dates and times and shooting dates and times of the images stored in the digital camera do not match, without imparting a sense of unnaturalness.

As described thus far, according to the above embodiment, in an image processing apparatus capable of browsing images saved in a computer and images saved in a digital camera, the following is performed:

the images saved in the computer are sorted in shooting date and time order; and the images saved in the digital camera are sorted in updated date and time order of the image file (that is, the sorting in shooting date and time order is replaced with sorting in updated date and time order). Such a configuration makes it possible to sort the images saved in the digital camera at high speed as well and display the results of the sorting.

In other words, according to the above-described embodiment, using information of the updated date and time when sorting images saved in the digital camera in shooting date and time order makes it possible to omit the procedures for acquiring the image data, analyzing the Exif information, and so on. As a result, it is possible to execute the sorting process, the image display process, and so on at high speed. Furthermore, in the case where there are images saved in the digital camera for which the updated dates and times and shooting dates and times do not match, it is possible to apply the sort results to the image display without imparting a sense of unnaturalness to the user.

Note that although still image data is given as an example of the image files in the above-described embodiment, the image files may be moving image data. Therefore, the digital camera 200 maybe either a digital still camera or a digital video camera.

Other Embodiments

Although the above embodiment describes a configuration that switches between the first view and the second view, as shown in FIG. 4, the invention is not limited to such a screen configuration. For example, as shown in FIG. 14, a first area 1401, displaying images stored in the digital camera, and a second area 1402, displaying the images stored in the computer, may be displayed.

As described thus far, according to the present invention, the speed of a sorting process for image files within a camera is increased, thereby reducing the difference in speed between that sorting process and a sorting process for image files within a PC.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet web page and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different web pages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download decryption key information from a web page via the Internet, use the key information to decrypt the program, and install the program on a computer.

Also, in addition to execution via loading of a program using a computer, the functions of the present embodiment may be realized through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application Nos. 2008-013090, filed Jan. 23, 2008 and 2009-001109, filed Jan. 6, 2009, which are hereby incorporated by reference herein in their entirety.

What is claimed is:

1. An information processing apparatus capable of communicating with an external apparatus, the information processing apparatus comprising:
a control unit configured to control the information processing apparatus,
wherein the control unit performs:
a first obtaining step of obtaining, from the external apparatus, a plurality of first image data each included in a first image file stored in a storage medium of the external apparatus;
a second obtaining step of obtaining information of the first image files from a management area of the storage medium of the external apparatus;
a first readout step of reading out a plurality of second image data each included in a second image file stored in a storage medium of the information processing apparatus; and
a second readout step of reading out an information of the second image data from header of the second image file; and
an output step of outputting a first view that outputs the plurality of first image data obtained from the external apparatus, and a second view that outputs the plurality of second image data read out from the storage medium of the information processing apparatus;
wherein the plurality of first image data are outputted in an order based on the information of the first image files from the management area of the storage medium of the external apparatus in response to start of outputting the first view in the output step, and the plurality of second image data are outputted in an order based on the information of the second image files from header of the second image files in response to start of outputting the second view in the output step.

2. The apparatus according to claim 1, wherein the control unit further performs a switching step of switching between outputting the first view and outputting the second view in accordance with a user's operation.

3. The apparatus according to claim 2,
wherein, in the output step, the control unit re-outputs the plurality of first image data in an order based not on the information of the first image files obtained from the management area of the storage medium of the external apparatus but rather on information stored in a header of the first image files in a case where an instruction has been made to switch from the second view to the first view.

4. The apparatus according to claim 1,
wherein, in the second obtaining step, the information of the first image files is obtained before the plurality of first image data are obtained in the first obtaining step; and
in the first obtaining step, the control unit obtains the first image data in an order based on the information of the first image files obtained in the second obtaining step.

5. The apparatus according to claim 1, wherein the control unit further performs a comparing step of comparing the information of the first image files stored in the storage medium of the external apparatus obtained in the second obtaining step with information stored in a header of the first image files,
wherein in the output step, the control unit outputs the first view in an order based on the information stored in a header of the first image files in a case where a result of a comparison performed in the comparing step indicates that the information of the first image files obtained from the management area of the storage medium of the external apparatus differs from the information stored in the header of the first image files.

6. The apparatus according to claim 1,
wherein, in the output step, the control unit re-outputs the plurality of first image data in an order based not on the information of the first image files obtained from the management area of the storage medium of the external apparatus but rather on information stored in a header of the first image files when the output of the plurality of first image data is updated based on a user's operation in the first view.

7. The apparatus according to claim 1, wherein the management area is an entry of the storage medium of the external apparatus.

8. The apparatus according to claim 1, wherein the image processing apparatus and the external apparatus are connected by wired communication.

9. The apparatus according to claim 1, wherein the image processing apparatus and the external apparatus are connected via USB (Universal Serial Bus) cable.

10. The apparatus according to claim 1, wherein the image processing apparatus and the external apparatus are connected by wireless communication.

11. The apparatus according to claim 1, wherein the image processing apparatus and the external apparatus are connected in accordance with IEEE802.11.

12. The apparatus according to claim 1, wherein communication between the image processing apparatus and the external apparatus is performed in accordance with PTP (Picture Transfer Protocol).

13. The apparatus according to claim 1, wherein the management area is an area other than an area where the image file managed by a file system is recorded.

14. The apparatus according to claim 1, wherein, in the second readout step, the control unit reads out the information of the second image data from Exif area, wherein the Exif area is an area existing within the header of the second image file.

15. The apparatus according to claim 1, wherein information of the first image files recorded in the management area includes at least one of a name of the first image file, shooting time, update time, and file size.

16. The apparatus according to claim 1, wherein the external apparatus is an image capturing device.

17. The apparatus according to claim 1, wherein the first image data is recorded in a header of the first image file, and the second image data is recorded in a header of the second image file.

18. The apparatus according to claim 1, wherein the information of the first image file recorded in the management area includes update time and the information of the second image file recorded in the header of the second image file includes shooting time.

19. The apparatus according to claim 1, wherein the output unit comprises a display unit, and the output unit outputs the image data by displaying the first and second image data.

20. A control method for an information processing apparatus capable of communicating with an external apparatus, the method comprising:
- a first obtaining step, by a control unit configured to control the information processing apparatus, of obtaining, from the external apparatus, a plurality of first image data each included in a first image file stored in a storage medium of the external apparatus;
- a second obtaining step, by a control unit configured to control the information processing apparatus, of obtaining information of the first image files from a management area of the storage medium of the external apparatus;
- a first reading step, by a control unit configured to control the information processing apparatus, of reading out a plurality of second image data each included in a second image file stored in a storage medium of the information processing apparatus; and
- a second reading step, by a control unit configured to control the information processing apparatus, of reading out an information of the second image data from header of the second image file; and
- a output step, by a control unit configured to control the information processing apparatus, of outputting a first view that outputs the plurality of first image data obtained in the first obtaining step from the external apparatus, and a second view that output s the plurality of second image data read out in the first reading step from the storage medium of the information processing apparatus;
- wherein the plurality of first image data are outputted in an order based on the information of the first image files from the management area of the storage medium of the external apparatus in response to start of outputting the first view in the output step, and the plurality of second image data are outputted in an order based on the information of the second image files from header of the second image files in response to start of outputting the second view in the output step.

21. A non-transitory storage medium in which is stored a computer-readable program for causing a computer to execute the control method of claim 20.

\* \* \* \* \*